(12) United States Patent
Kim

(10) Patent No.: US 11,581,774 B2
(45) Date of Patent: *Feb. 14, 2023

(54) MOTOR STATOR INSULATOR WITH ROTATABLE WINGS

(71) Applicant: LG INNOTEK CO., LTD., Seoul (KR)

(72) Inventor: Yong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 694 days.

This patent is subject to a terminal disclaimer.

(21) Appl. No.: 16/072,788

(22) PCT Filed: Jan. 10, 2017

(86) PCT No.: PCT/KR2017/000267
§ 371 (c)(1),
(2) Date: Jul. 25, 2018

(87) PCT Pub. No.: WO2017/146372
PCT Pub. Date: Aug. 31, 2017

(65) Prior Publication Data
US 2019/0044404 A1    Feb. 7, 2019

(30) Foreign Application Priority Data

Feb. 23, 2016    (KR) .................. 10-2016-0021300

(51) Int. Cl.
*H02K 3/34* (2006.01)
*H02K 3/52* (2006.01)
(Continued)

(52) U.S. Cl.
CPC ............ *H02K 3/345* (2013.01); *H02K 3/522* (2013.01); *H02K 5/22* (2013.01); *H02K 15/0081* (2013.01);
(Continued)

(58) Field of Classification Search
CPC .... H02K 3/522; H02K 2203/09; H02K 5/225; H02K 3/28; H02K 2203/06;
(Continued)

(56) References Cited

U.S. PATENT DOCUMENTS 8,314,528 B2 * 11/2012 Shinohara .............. H02K 3/522
310/194
10,923,979 B2 * 2/2021 Lee ......................... H02K 3/522
(Continued)

FOREIGN PATENT DOCUMENTS

EP    2916437 A1 *  9/2015  ............ H02K 3/522
JP    11-122855 A    4/1999
(Continued)

OTHER PUBLICATIONS

Nielsen (EP 2916437 A1) English Translation (Year: 2015).*

*Primary Examiner* — Tulsidas C Patel
*Assistant Examiner* — Robert E Mates
(74) *Attorney, Agent, or Firm* — Birch, Stewart, Kolasch & Birch, LLP

(57) ABSTRACT

The present invention provides a motor including a stator around which coils are wound, a rotor disposed inside the stator, a rotating shaft coupled to the rotor, insulators positioned between the coils and the stator and including outer circumferential surfaces around which the coils are wound, and a motor housing configured to accommodate the insulators, wherein wings configured to arrange the coils are connected to the outer surfaces of the insulators, and an accommodation space configured to accommodate the wings is formed inside the motor housing.

13 Claims, 8 Drawing Sheets

(51) Int. Cl.
   *H02K 15/00*     (2006.01)
   *H02K 5/22*      (2006.01)
   *H02K 15/02*         (2006.01)
   *H02K 15/14*         (2006.01)

(52) U.S. Cl.
   CPC ........... *H02K 15/026* (2013.01); *H02K 15/14* (2013.01); *H02K 2203/06* (2013.01); *H02K 2203/09* (2013.01)

(58) Field of Classification Search
   CPC .. H02K 2203/12; H02K 3/50; H02K 2203/03; H02K 15/0068; H02K 3/34; H02K 3/38; H02K 5/08; H02K 3/345; H02K 15/0081
   USPC .......... 310/71, 194, 179–180, 201, 208, 310
   See application file for complete search history.

(56) References Cited

U.S. PATENT DOCUMENTS

| | | | | |
|---|---|---|---|---|
| 2013/0154427 | A1* | 6/2013 | Asaga | H02K 3/50 310/180 |
| 2014/0015358 | A1* | 1/2014 | Wan | H02K 15/02 310/71 |

FOREIGN PATENT DOCUMENTS

| | | |
|---|---|---|
| JP | 2007-288821 A | 11/2007 |
| JP | 2010-110048 A | 5/2010 |
| JP | 2014-121167 A | 6/2014 |
| KR | 10-2013-0057149 A | 5/2013 |

\* cited by examiner

[FIG. 1]
1
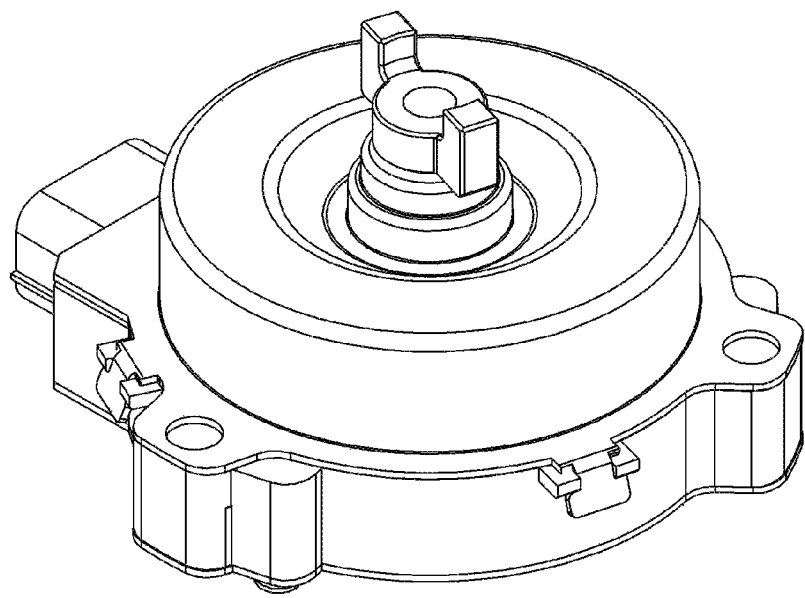

[FIG. 2]
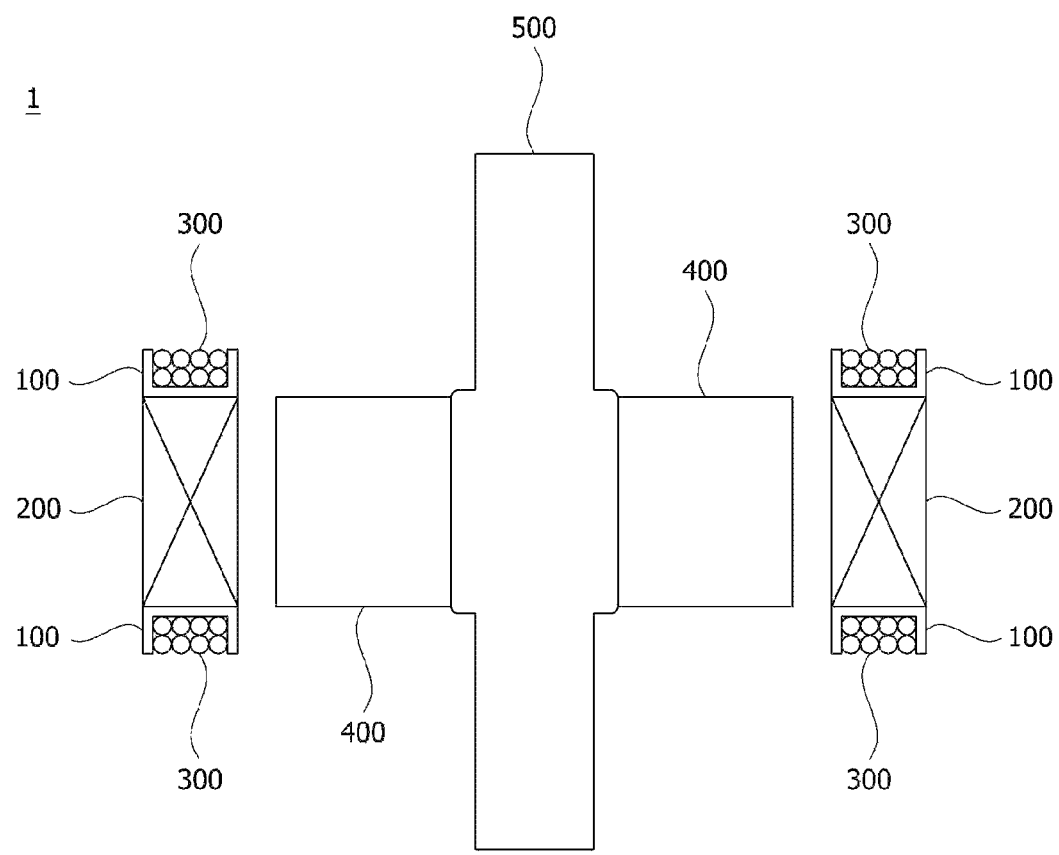

[FIG. 3]
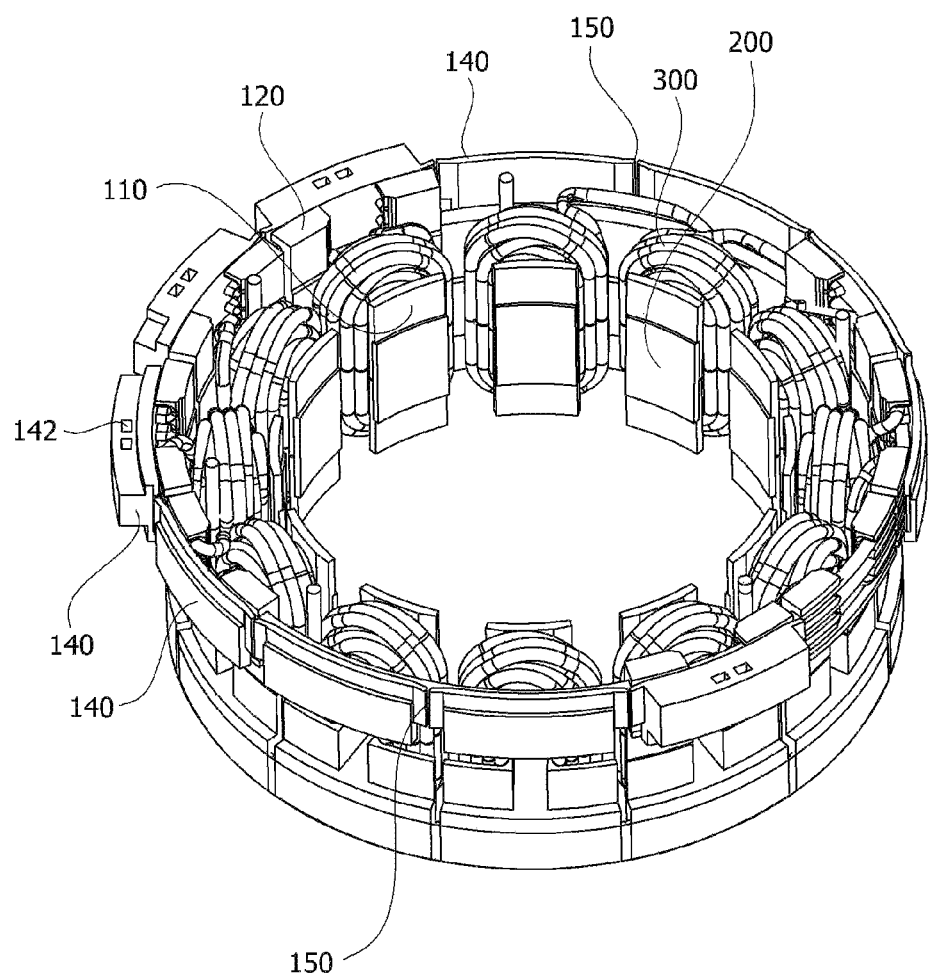

[FIG. 4]
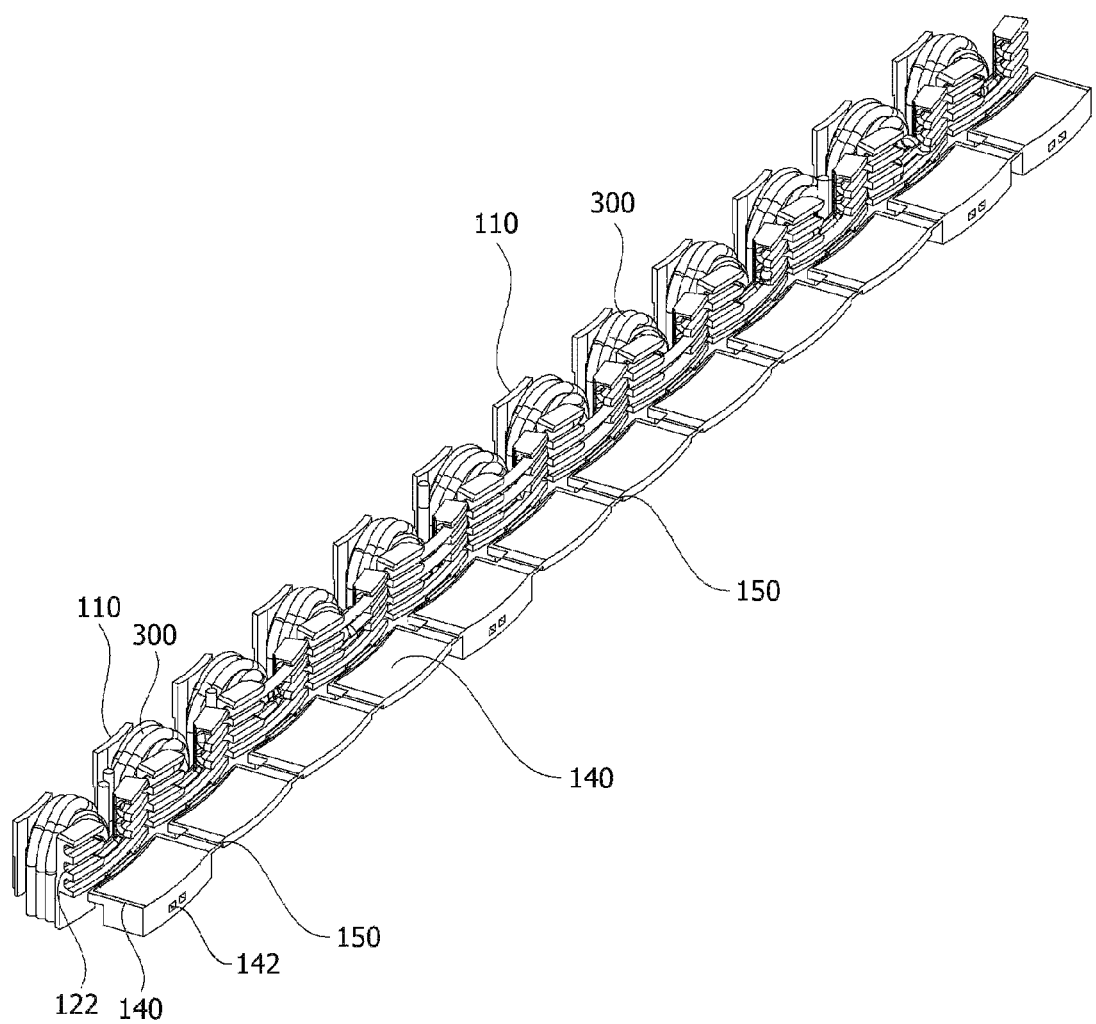

[FIG. 5]
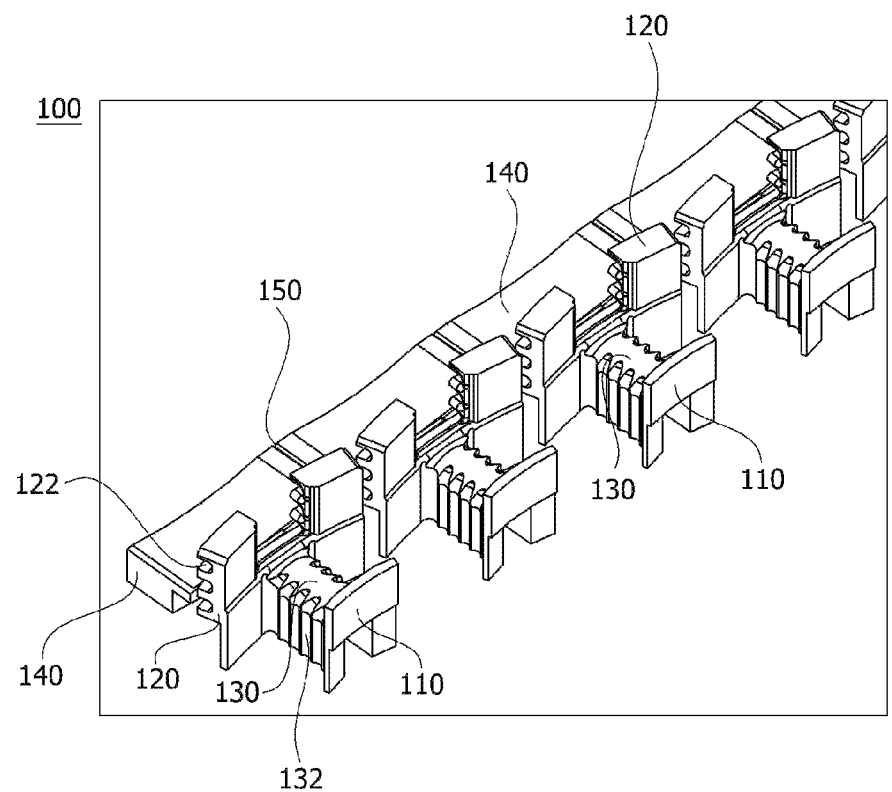

[FIG. 6]
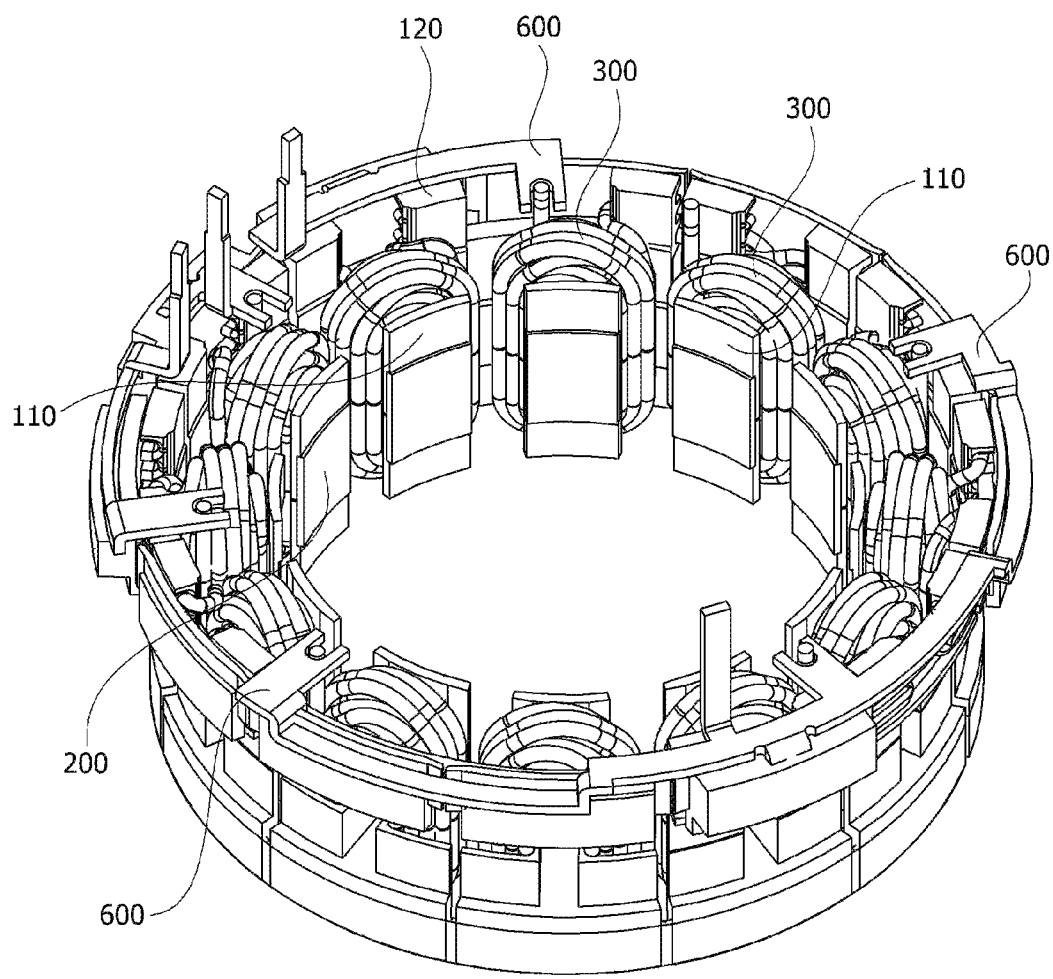

[FIG. 7]
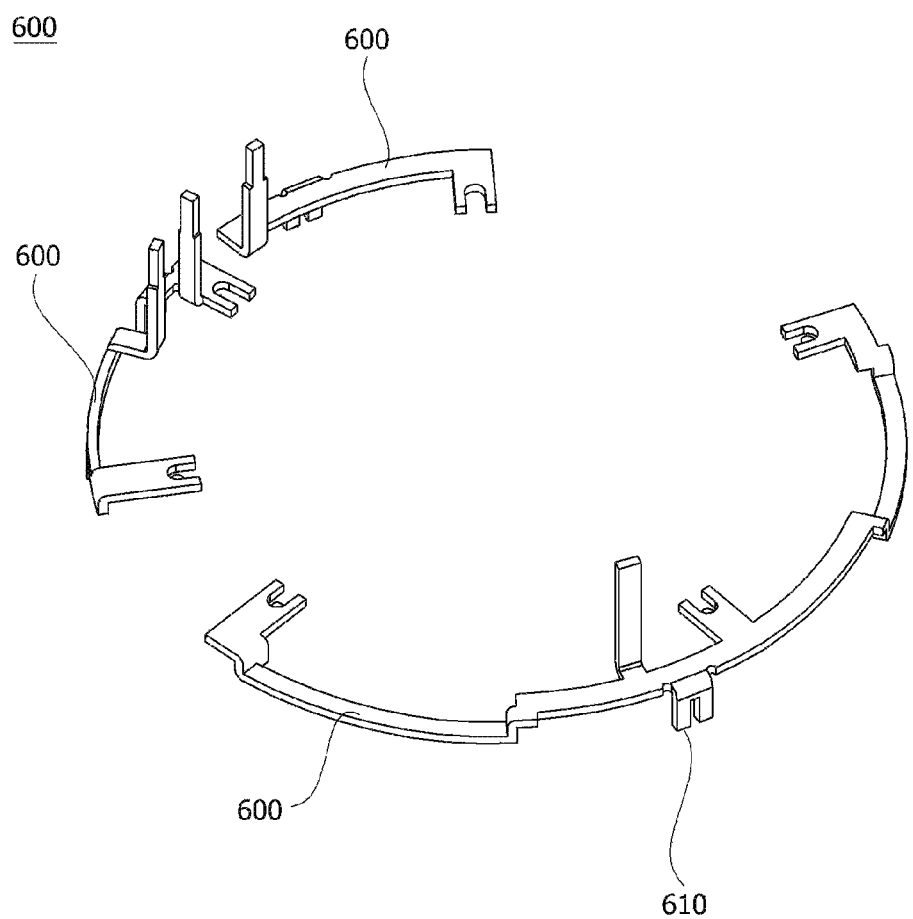

[FIG. 8] Conventional Art
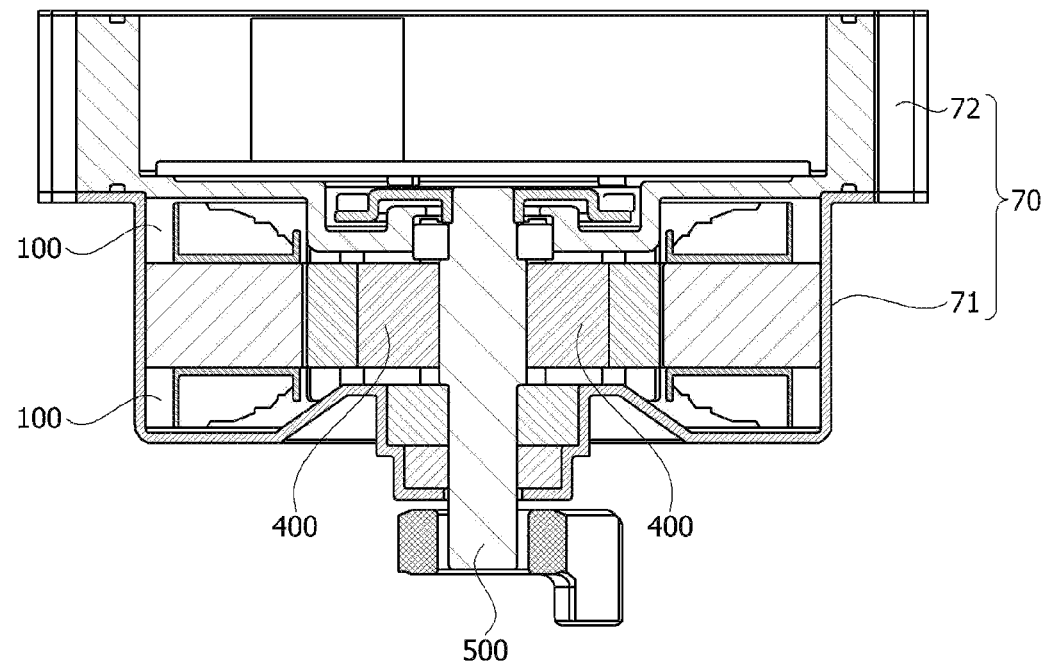
[FIG. 9]
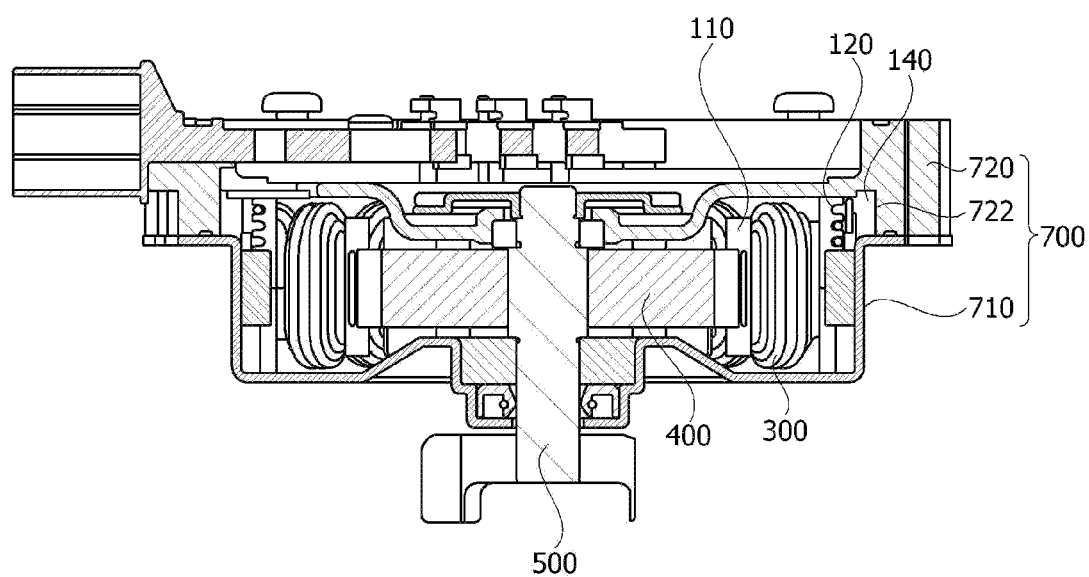

MOTOR STATOR INSULATOR WITH ROTATABLE WINGS

CROSS REFERENCE TO RELATED APPLICATIONS

This application is the National Phase of PCT International Application No. PCT/KR2017/000267, filed on Jan. 10, 2017, which claims priority under 35 U.S.C. 119(a) to Patent Application No. 10-2016-0021300, filed in the Republic of Korea on Feb. 23, 2016, all of which are hereby expressly incorporated by reference into the present application.

TECHNICAL FIELD

The present invention relates to a motor for expanding a design space in a housing.

BACKGROUND ART

Motors are apparatuses which convert electrical energy into rotational energy using a force received by a conductor in a magnetic field. Recently, as a use of the motor expands, a role of the motor becomes important. Particularly, as the number of electrical devices in vehicles rapidly increases, demand for the motor applied to a steering system, a braking system, a safety critical system, and the like is greatly increasing.

Generally, a motor includes a rotatably formed rotating shaft, a rotor coupled to the rotating shaft, and a stator fixed inside a housing, and the stator is installed to be spaced apart from the rotor along a circumference of the rotor. In addition, coils for generating a rotating magnetic field are wound around the stator, and the stator and the rotor induce an electric interaction to induce rotation of the rotor. When the rotor rotates, the rotating shaft rotates to generate or supplement various driving forces for running a vehicle.

Generally, in order to arrange coils positioned inside a conventional motor, various methods are used, wherein a structure of an insulator is changed, a busbar is applied thereto, or the like.

However, in a case in which coils are arranged by using a busbar, a height of a motor may be increased due to fixing of the busbar, and in a case in which an insulator integrated with a busbar is used, there is an advantage in terms of height of the motor, but a width of the motor is increased. This is not consistent with the current trend toward miniaturizing a motor while the motor outputs the same output.

DISCLOSURE

Technical Problem

The present invention is directed to providing a motor in which an accommodation space for accommodating wings for arranging coils is formed through a design change in a motor housing.

Objectives solved by the present invention are not limited to the above-described objectives, and other objectives, which are not described above, may be clearly understood by those skilled in the art through the following specification.

Technical Solution

One aspect of the present invention provides a motor including: a stator around which coils are wound; a rotor disposed inside the stator; a rotating shaft coupled to the rotor; insulators positioned between the coils and the stator and including outer circumferential surfaces around which the coils are wound; and a motor housing configured to accommodate the insulators, wherein wings configured to arrange the coils are connected to the outer surfaces of the insulators, and an accommodation space configured to accommodate the wings is formed inside the motor housing.

The motor housing may include a housing and a housing cover, and the accommodation space may be formed inside the housing cover.

The insulator may include an inner guide, an outer guide, and a body configured to connect the inner guide and the outer guide, and the wing may be rotatably connected to an outer surface of the outer guide.

A plurality of guide grooves configured to guide the coils may be formed in the outer surface of the outer guide.

The wing and the adjacent wing may be connected by a connecting part.

A notch may be formed in the connecting part.

A busbar connecting part connected to a busbar may be formed on at least one of the plurality of wings.

The accommodation space formed inside the motor housing may be divided and formed to accommodate the plurality of wings.

Among the plurality of wings, a thickness of the wing in which the busbar connecting part is formed may be greater than that of the wing in which the busbar connecting part is not formed.

A size of the accommodation space may be changed according to whether the busbar connecting part is formed in the wing.

The housing may have a height which is to expose the wing connected to the insulator to the outside, and the wing may be positioned in the accommodation space formed inside the housing cover.

Advantageous Effects

As described above, since a space for winding is reduced in the motor, there is an effect that the motor can be miniaturized.

In addition, since a space for a motor housing is secured, there is an effect that a degree of design freedom of the motor can be increased.

In addition, there is an effect that an interference problem between coils can be solved while the coils of the motor are wound.

Various useful advantages and effects may not be limited to the above-described effects, and may be more easily understood through a process in which specific embodiments of the present invention are described.

DESCRIPTION OF DRAWINGS

FIG. 1 is a perspective view illustrating a motor according to one embodiment of the present invention.

FIG. 2 is a cross-sectional view illustrating an internal configuration of the motor of FIG. 1.

FIG. 3 is a view illustrating a shape of a stator which is a component of the motor of FIG. 1.

FIG. 4 is a view illustrating a state in which the stator of FIG. 3 is spread.

FIG. 5 is a view illustrating an insulator which is a component of the stator of FIG. 3.

FIG. 6 is a view illustrating a state in which the stator of FIG. 3 is connected to busbars.

FIG. 7 is a view illustrating shapes of the busbars of FIG. 6.

FIG. 8 is a cross-sectional view illustrating a conventional motor.

FIG. 9 is a cross-sectional view illustrating the motor according to the embodiment of the present invention.

MODES OF THE INVENTION

While the present invention may be modified in various ways and take on various alternative forms, specific embodiments thereof are shown in the drawings and described in detail below. However, it should be understood that there is no intent to limit the present invention to the particular forms disclosed, but on the contrary, the present invention covers all modifications, equivalents, and alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

The terminology used herein to describe embodiments of the present invention is not intended to limit the scope of the present invention. The articles "a," and "an" are singular in that they have a single referent, however the use of the singular form in the present document should not preclude the presence of more than one referent. In other words, elements of the present invention referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when in a case in which one element is described as being formed on (or under) another element, such a description may include a case in which the one element is formed at an upper side or a lower side with respect to the another element.

Hereinafter, the exemplary embodiments of the present invention will be described in detail with reference to the accompanying drawings. The same or corresponding elements will be consistently denoted by the same respective reference numerals and described in detail no more than once regardless of drawing symbols.

Only main components are clearly illustrated in FIGS. 1 to 9 to clearly conceptually understand the present invention, as a result, various modifications of the drawings are predicted, and the scope of the present invention need not be limited by specific shapes of the components illustrated in the drawings.

FIG. 1 is a perspective view illustrating a motor according to an embodiment of the present invention and FIG. 2 is a brief cross-sectional view illustrating an internal structure of the motor. The cross-sectional view of FIG. 2 is for illustrating an entire configuration and positions of the motor.

Referring to FIGS. 1 and 2, a motor 1 may include a stator 200 around which coils 300 are wound, a rotor 400 disposed inside the stator 200, a rotating shaft 500 coupled to the rotor 400, and insulators 100 positioned between the coils 300 and the stator 400 and including outer circumferential surfaces around which the coils 300 are wound.

The insulators 100 serve to isolate the coils 300 from the stator 200 so that current does not flow between the coils 300 and the stator 200. The insulator 100 may be formed of a resin material. The insulator 100 will be described below again.

The stator 200 may be formed by stacking a plurality of steel plates including ring-shaped yoke portions and tooth portions which are disposed in a circumferential direction, protrude inward from the yoke portions in a diameter direction, and are spaced an equiangular interval from each other. Coils for generating a rotating electromagnetic field may be wound around the tooth portions. Here, the stator 200 may be insulated from the coils 300 by the insulators 100.

The rotor 400 is disposed inside the stator 200. The rotor 400 may be formed by coupling rotor cores and magnets, and in some cases, the rotor cores may also be integrally formed with the magnets. In addition, the rotor 400 may be formed by coupling the magnets to outer circumferential surfaces of the rotor cores, or inserting the magnets into pockets of the rotor cores. A sensing magnet (not shown) for obtaining position information of the rotor is coupled to a plate and installed above the rotor 400, or a similar rotor position detecting unit may be installed thereabove.

When current is supplied to the coils 300 wound around the stator 200, a mutual interaction is induced between the stator 100 and the rotor 400 to induce rotation of the rotor 400. When the rotor 400 rotates, a rotating shaft 500 rotates to provide power.

FIG. 3 is a view illustrating a shape of a stator which is a component of the motor, FIG. 4 is a view illustrating a state in which the stator is spread, and FIG. 5 is a view illustrating an insulator which is a component of the present invention.

Referring to FIGS. 3 to 5, the insulators 100 may include inner guides 110, outer guides 120, bodies 130, and wings 140.

The insulators 100 form an inner space for accommodating the stator 200 and serve to block contacts between the coils 300 and the stator 200 when the coils 300 are wound around the outer circumferential surfaces to insulate the coils 300 from the stator 200 so that a current does not flow therebetween.

The plurality of insulators 100 may be provided and coupled to the stator 200, and as one example, the insulators 100 may be coupled to upper and lower portions of the stator 200. In addition, the insulators 100 may be integrally formed, the stator 200 may be inserted into the insulators 100, and therefore a coupling structure of the insulators 100 may be variously modified.

The inner guides 110 may be positioned to face the rotor 400 disposed inside the inner guide 110, and may have a predetermined curvature. The inner guides 110 may have an inner space for accommodating the stator 200, and a shape of the inner space may be modified to various shapes for accommodating the stator 200.

The outer guides 120 may be positioned to face a housing (not shown) of the motor 1, and may have a predetermined curvature. The outer guides 120 may also have an inner space for accommodating the stator 200, and a shape of the inner space may be modified to various shapes for accommodating the stator 200.

The bodies 130 insulate the stator 200 from the coils 300 and connect the outer guides 120 and the inner guides 110. A plurality of arrangement grooves 132 may be formed in the bodies 130 to arrange the coils 300 in a case in which the coils 300 are wound around the bodies 130. A width or the number of the arrangement grooves 132 may be changed according to a size of the motor 1 or stator 200, and a shape of the arrangement groove 132 may be variously modified to arrange the coil 300.

Heights of the inner guide 110 and the outer guide 120 may be greater than that of the body 130. The coil 300 may be wound around the body 130 to form a plurality of layers. The coil 300 may be guided by the arrangement grooves 132 in the case of a lowermost layer, but since there is a risk that the coil may escape from the body in the case of upper layers, the inner guide 110 and the outer guide 120 may be formed to be higher than the body 130 to prevent the escape of the coil 300. In addition, in order to prevent the escape of the coil 300, widths of the inner guide 110 and the outer guide 120 may be greater than that of the body 130.

As described above, the inner guide 110, the outer guide 120, and the body 130 included in the insulator 100 may prevent contacts between the coil 300 and the stator 200.

Wings 140 may be connected to outer surfaces of the insulators 100 and arrange the coils. The wing 140 may be individually attached and connected to the outer surface of the insulator 100, or may be integrally manufactured with the insulator 100.

As one example, the wings 140 may be rotatably connected to outer surfaces of the outer guides 120. Generally, the coils 300 are wound around the insulators 100, collected, and connected to terminals. In a case in which ends of the coils 300 are connected to the terminals, the coils 300 need to be arranged, and connected to the terminals in the provided spaces through various methods. When the ends of the coils 300 of phases are positioned far away, the coils 300 are wound around outer shells of the insulators 100. In the case in which the coils 300 are connected to the terminals through outer spaces of the insulators 100, the connections are restricted by the outer spaces for connecting the coils 300 to the terminals. However, the wings 140 of the outer guides 120 may rotate to cover the coils 300 after the coils 300 are arranged. The wings 140 may serve to insulate the coils 300 arranged outside the insulators 100.

A plurality of guide grooves 122 for guiding the coils 300 arranged on the outer surfaces may be formed in the outer guides 120. The outer guide 120 may have a slim structure to reduce material cost, and after the coils 300 are inserted into the guide grooves 122, the wings 140 may be pressed against the coils 300. The wing 140 may have a height to cover all the guide grooves 122. As one example, the outer guide 120 may include three guide grooves 122 to guide three phase lines.

In the plurality of insulators 100 inserted into the motor 1, the adjacent wings 140 may be connected by connecting parts 150. In this case, the connecting parts 150 for connecting the plurality of wings 140 may be integrally connected to the insulators 100. In a case in which the insulators 100 are injection-molded as described above, a winding operation may be performed in a state in which the stator 200 is spread, and there is an effect that the winding operation is simplified when the winding operation is performed in the state in which the stator 200 is spread in a line shape because distances between slots are long. Here, there is an effect that a space factor is improved when the number of windings around the stator 200 is increased.

A notch may be formed in the connecting part 150 to facilitate rotation of the integrated insulator 100 after the winding operation. In addition, the connecting part 150 may have a height lower than that of the wing 140 to facilitate the rotation of the insulator 100.

As described above, the plurality of wings 140 are integrally connected to the connecting parts 150, the coils 300 are wound around the insulators, and the plurality of wings 140 are rotated and folded toward the outer guide 120. Then, a user may assemble the stator 200 in a cylindrical shape by rolling all the insulators 100. In the integrated insulators 100, the wings 140 are not necessarily connected by the connecting parts 150, and the outer guides 120 may be connected by the connecting parts to form an integrated structure. Features of a structure of the connecting parts 150 for connecting the wings 140 may be applied to all of the connecting parts for connecting the outer guides 120.

Busbar connecting parts 142 connected to busbars may be formed in the wings 140. The busbars are for connecting the coils disposed in parallel and are electrically connected to the coils. A kind or shape of the busbar is not limited, and may be variously modified.

As one example, the busbar connecting part 142 may be formed in an upper surface of the wing 140 when the wing 140 rotates toward the outer guide 120, and a groove into which the busbar is inserted may be formed in the busbar connecting part 142. The busbar may have a protrusion to be inserted into the busbar connecting part 142, and a position of the groove and a position of the connecting part may be switched.

In addition, in a case in which the insulators 100 are formed integrally, the busbar connecting part 142 may be formed on at least one of the plurality of wings 140. The thickness of the wing 140 in which the busbar connecting part 142 is formed may be greater than that of the wing 140 in which the busbar connecting part 142 is not formed so as to support the busbar. Since the busbar connecting parts 142 do not need to be formed in all of the wings 140 to fix the busbars, there is an effect that the busbar connecting parts 142 may be formed only at necessary positions to reduce cost.

FIG. 6 is a view illustrating a state in which the busbar and the stator which are components of the motor are connected, and FIG. 7 is a view illustrating a shape of the busbar.

Referring to FIGS. 6 and 7, busbars 600 may be inserted into the busbar connecting parts 142 formed in upper portions of the wings 140. The plurality of busbars 600 may be provided, and material cost may be reduced in comparison to when the busbars 600 are integrally formed. Protrusions 610 connected to the busbar connecting parts 142 may be formed on the busbars 600. The protrusion 610 may be modified according to a shape of the busbar connecting part 142.

Since the busbar is inserted into the integrated insulator and used as described above, a process may be simplified and automated.

FIG. 8 is a cross-sectional view illustrating a conventional motor, and FIG. 9 is a cross-sectional view illustrating the motor according to the embodiment of the present invention.

Referring to FIG. 8, in the conventional motor, components of the motor are positioned in a motor housing. A motor housing 70 may include a housing 71 and a housing cover 72.

In the conventional motor, the housing 71 has a height which is to accommodate the insulator 100 and uses the housing cover 72 to seal the components of a motor 1 which are positioned in the motor housing 70.

Referring to FIG. 9, a motor housing 700 of a motor 1 according to the embodiment of the present invention may form an accommodation space for accommodating the wings 140 connected to the outer surfaces of the insulators 100 and configured to arrange the coils 300.

The motor housing 700 which is a component of the embodiment of the present invention may include a housing 710 and a housing cover 720, and an accommodation space 722 for accommodating the wings may be formed inside the housing cover 720.

The motor housings of FIGS. 8 and 9 will be compared. The housing 71 of the conventional motor housing 70 has the height which is to accommodate the insulator 100. However, the housing 710 of the motor housing 700 according to the embodiment of the present invention has a lower height to allow the wing 140 connected to the outer surface of the insulator 100 to be exposed to the outside in a case in which the insulator 100 is inserted into the housing 710. Here, an outer portion of the housing cover 720 may extend, and the accommodation space 722 for accommodating the wing 140 may be formed inside the extended outer portion.

By changing a shape of the motor housing 700, an entire size of the motor may reduce, and a degree of design freedom within a motor space may increase.

The accommodation space 722 formed inside the housing cover 700 may accommodate the wing 140 connected to the outer surface of the outer guide 120 of the insulator 100. Here, the accommodation space 722 may be formed as one accommodation space and be continuously present along an inner surface of the housing cover 720, or may be formed as a plurality of divided accommodation spaces corresponding to thicknesses of the individual wings 140 to prevent shaking of the insulators 100.

As one embodiment, referring to FIGS. 3 to 6, the busbar connecting part 142 connected to the busbar 600 may be formed on at least one of the plurality of wings 140 connected to the insulators 100, and here, the thicknesses of the wings 140 in which the busbar connecting parts 142 are formed may be greater than those of the wings 140 in which the busbar connecting parts 142 are not formed. Accordingly, the accommodation space 722 divided and formed in the housing cover 720 may be changed to correspond to the thicknesses of the wings 140.

As described above, the embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The spirit and scope of the present invention should be interpreted by the appended claims and encompass all equivalents falling within the scope of the appended claims.

[Reference Numerals]

| | |
|---|---|
| 1: MOTOR | 100: INSULATOR |
| 110: INNER GUIDE | 120: OUTER GUIDE |
| 122: GUIDE GROOVE | 130: BODY |
| 132: ARRANGEMENT GROOVE | 140: WING |
| 142: BUSBAR CONNECTING PART | 150: CONNECTING PART |
| 200: STATOR | 300: COIL |
| 400: ROTOR | 500: ROTATING SHAFT |
| 600: BUSBAR | 610: PROTRUSION |
| 700: MOTOR HOUSING | 710: HOUSING |
| 720: HOUSING COVER | |
| 722: ACCOMMODATION SPACE | |

The invention claimed is:

1. A motor comprising:
a stator around which coils are wound;
a rotor disposed inside the stator;
a rotating shaft coupled to the rotor;
a plurality of insulators positioned between the coils and the stator and including outer circumferential surfaces around which the coils are wound; and
a motor housing configured to accommodate the plurality of insulators,
wherein each insulator includes an inner guide, an outer guide, and a body configured to connect the inner guide to the outer guide,
wherein a plurality of wings configured to arrange the coils are rotatably connected to corresponding outer surfaces of the outer guides of the plurality of insulators,
wherein the plurality of wings are configured to be rotated and folded toward the outer surfaces of the outer guides,
wherein an accommodation space configured to accommodate the plurality of wings is formed inside the motor housing,
wherein the motor housing includes a housing and a housing cover, and the accommodation space is formed inside the housing cover,
wherein a plurality of guide grooves configured to guide the coils are formed in the outer surfaces of the outer guides, and
wherein each wing of the plurality of wings is connected to an adjacent wing of the plurality of wings by a wing connecting part.

2. The motor of claim 1, wherein a notch is formed in the wing connecting part.

3. The motor of claim 1, wherein a busbar connecting part connected to a busbar is formed on at least one of the plurality of wings.

4. The motor of claim 3, wherein the accommodation space formed inside the motor housing is divided and formed to accommodate the plurality of wings.

5. The motor of claim 4, wherein, among the plurality of wings, a thickness of a wing in which the busbar connecting part is formed is greater than that of a wing in which the busbar connecting part is not formed.

6. The motor of claim 5, wherein a size of the accommodation space is changed according to whether the busbar connecting part is formed in the wing.

7. The motor of claim 5, wherein:
the housing of the motor housing has a height which is to expose the wing connected to the corresponding insulator to an outside, and
the wing is positioned in the accommodation space formed inside the housing cover of the motor housing.

8. The motor of claim 1, wherein each of the plurality of wings has a height to cover the plurality of guide grooves.

9. The motor of claim 1, wherein the wing connecting part has a height lower than that of the wing.

10. A motor comprising:
    a stator around which coils are wound;
    a rotor disposed inside the stator;
    a rotating shaft coupled to the rotor;
    a plurality of insulators positioned between the coils and the stator and including outer circumferential surfaces around which the coils are wound; and
    a motor housing configured to accommodate the plurality of insulators,
    wherein each insulator includes an inner guide, an outer guide, and a body configured to connect the inner guide to the outer guide,
    wherein a plurality of wings configured to arrange the coils are rotatably connected to corresponding outer surfaces of the outer guides of the plurality of insulators,
    wherein the plurality of wings are configured to be rotated and folded toward the outer surfaces of the outer guides,
    wherein an accommodation space configured to accommodate the plurality of wings is formed inside the motor housing,
    wherein the motor housing includes a housing and a housing cover, and the accommodation space is formed inside the housing cover, and
    wherein a busbar connecting part connected to a busbar is formed on at least one of the plurality of wings.

11. The motor of claim 10, wherein the busbar is electrically connected to the coils.

12. The motor of claim 11, wherein the busbar connecting part has a groove into which the busbar is inserted.

13. The motor of claim 12, wherein the busbar includes a protrusion which is inserted into the busbar connecting part.

* * * * *